United States Patent [19]

Young

[11] Patent Number: 5,577,703

[45] Date of Patent: *Nov. 26, 1996

[54] POWER ASSISTED ADJUSTMENT SYSTEM

[75] Inventor: Sheldon E. Young, DuPage County, Ill.

[73] Assignee: Vibro/Dynamics Corp., Broadview, Ill.

[*] Notice: The term of this patent shall not extend beyond the expiration date of Pat. No. 5,360,195.

[21] Appl. No.: 331,919

[22] Filed: Oct. 31, 1994

[51] Int. Cl.[6] ............................................. F16M 13/00
[52] U.S. Cl. ...................................... 248/550; 248/188.4
[58] Field of Search ................................ 248/550, 188.4, 248/188.2, 180, 638, 615, 634, 632

[56] References Cited

U.S. PATENT DOCUMENTS

| | | | |
|---|---|---|---|
| 2,706,607 | 4/1955 | Withers | 248/22 |
| 3,332,647 | 7/1967 | Young | 248/24 |
| 3,592,423 | 7/1971 | Mui | 248/24 |
| 3,807,034 | 4/1974 | Pevzner et al. | 29/559 |
| 3,931,947 | 1/1976 | Tagnon | 248/180 |
| 4,047,427 | 9/1977 | Young | 73/141 |
| 4,135,392 | 1/1979 | Young | 73/141 A |
| 4,489,991 | 12/1984 | Delam | 384/428 |
| 4,846,436 | 7/1989 | Young et al. | 248/542 |
| 4,930,741 | 6/1990 | Young et al. | 248/542 |
| 5,018,702 | 5/1991 | Roser et al. | 248/904 |
| 5,127,622 | 7/1992 | Whelpley et al. | 248/550 |
| 5,141,201 | 8/1992 | Mizuno et al. | 248/550 |
| 5,360,195 | 11/1994 | Young | 248/550 |

*Primary Examiner*—Karen J. Chotkowski
*Assistant Examiner*—Gwendolyn Wrenn
*Attorney, Agent, or Firm*—R. Jonathan Peters

[57] ABSTRACT

There is disclosed a power assisted adjustment system for a power assuming or bearing a load member in a desired condition, comprising an actuator in combination with an adjustment member adaptable for assuming a load, and a hydraulic cylinder for temporarily reducing the load on the adjustment member, thereby permitting adjustment of extremely heavy loads with a nominal input force to the actuator. The actuator is operably engagable with the adjustment means and movable relative to the adjustment member. Electric switch operably connected with the actuator actuates the cylinder between an activating position and non-activating position, thereby permitting adjustment of the adjustment member in response to movement of the actuator in the activating condition. An input force or torque applied to the actuator effects a desired adjustment of the adjustment member. When the input force is stopped or interrupted, the actuator is biased to a non-activating position. The cylinder is deactivated and ceases to assume the portion of the load taken up, and that portion of the load is returned or transferred back to the adjustment member.

7 Claims, 2 Drawing Sheets

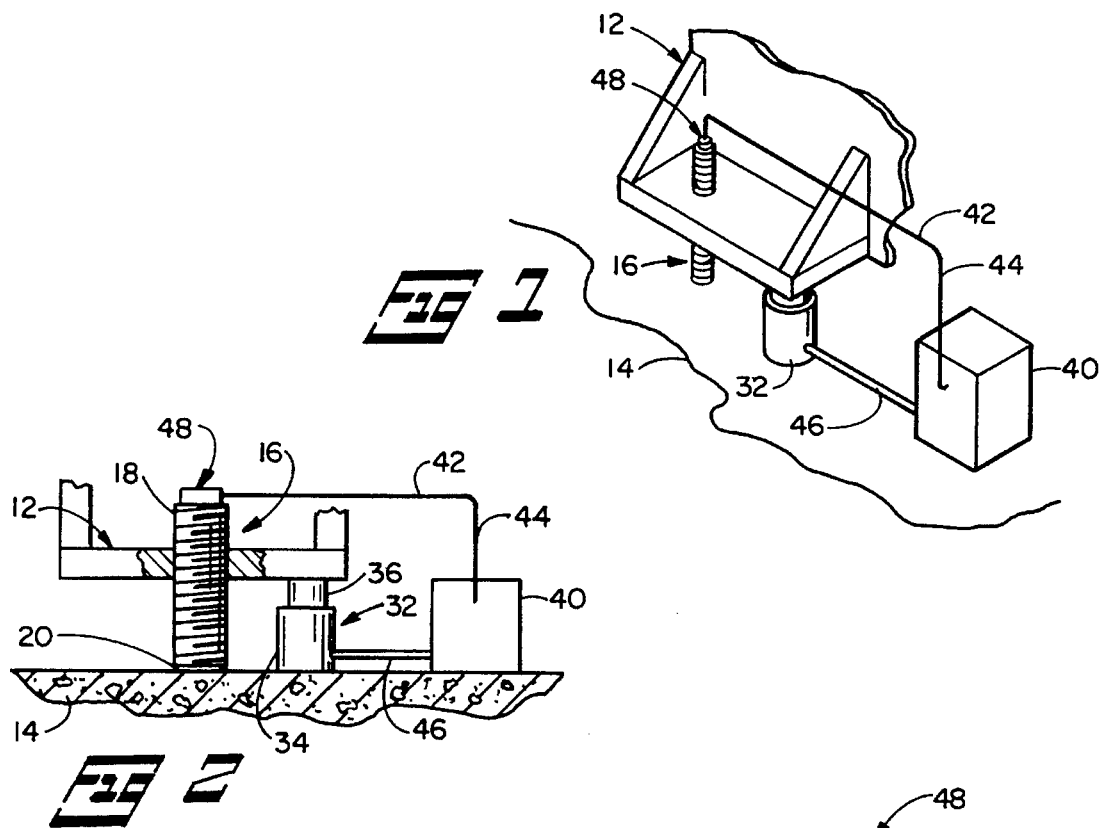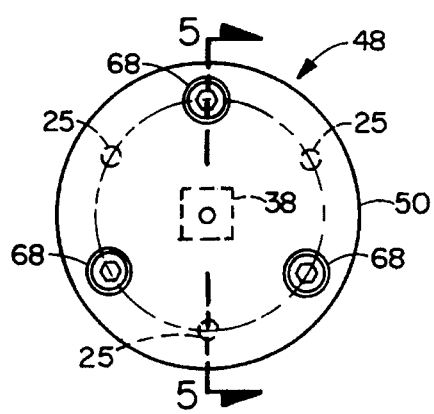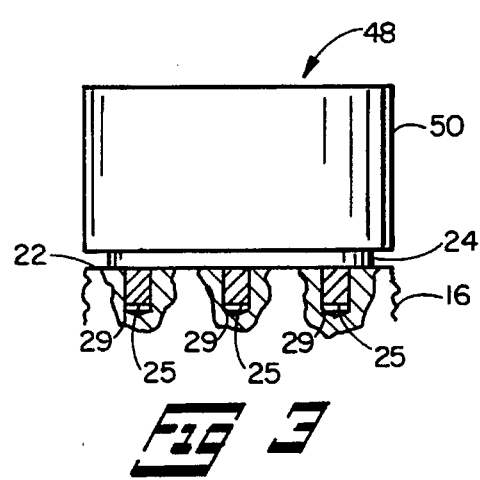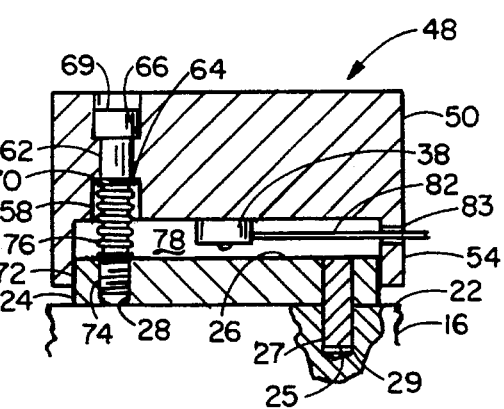

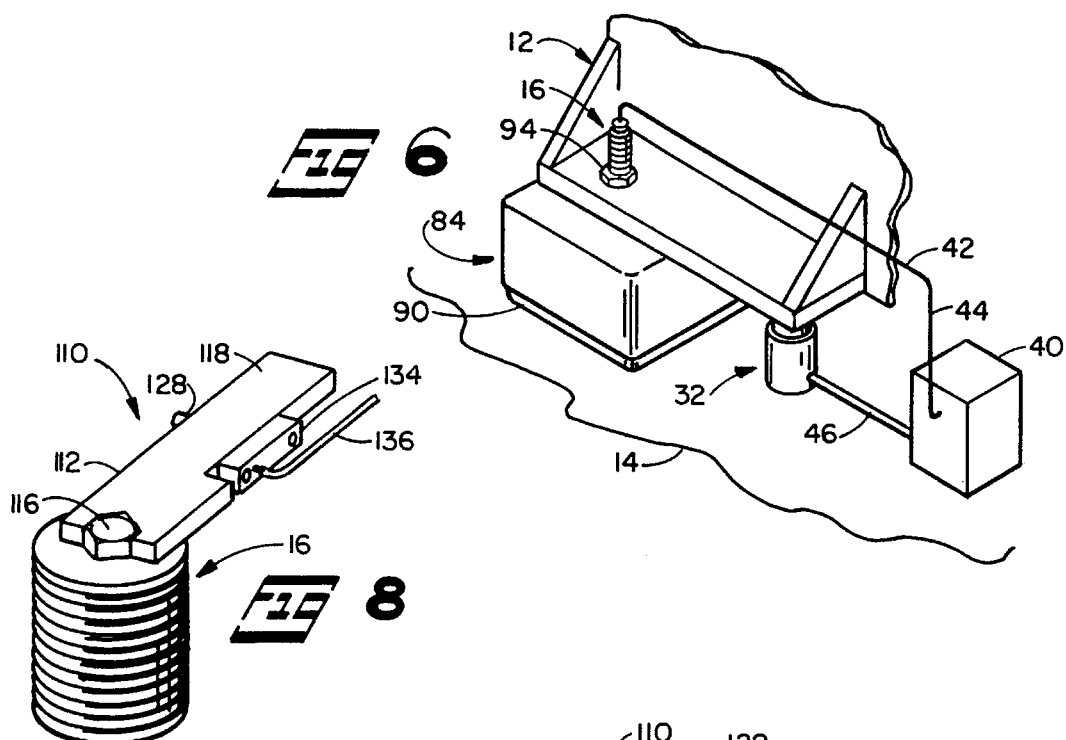
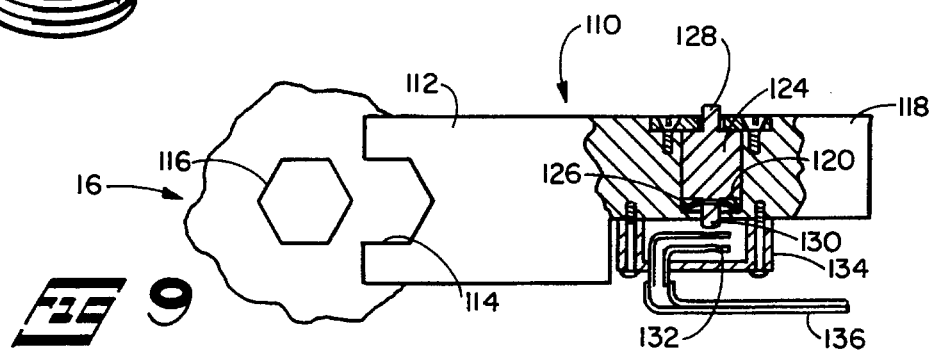
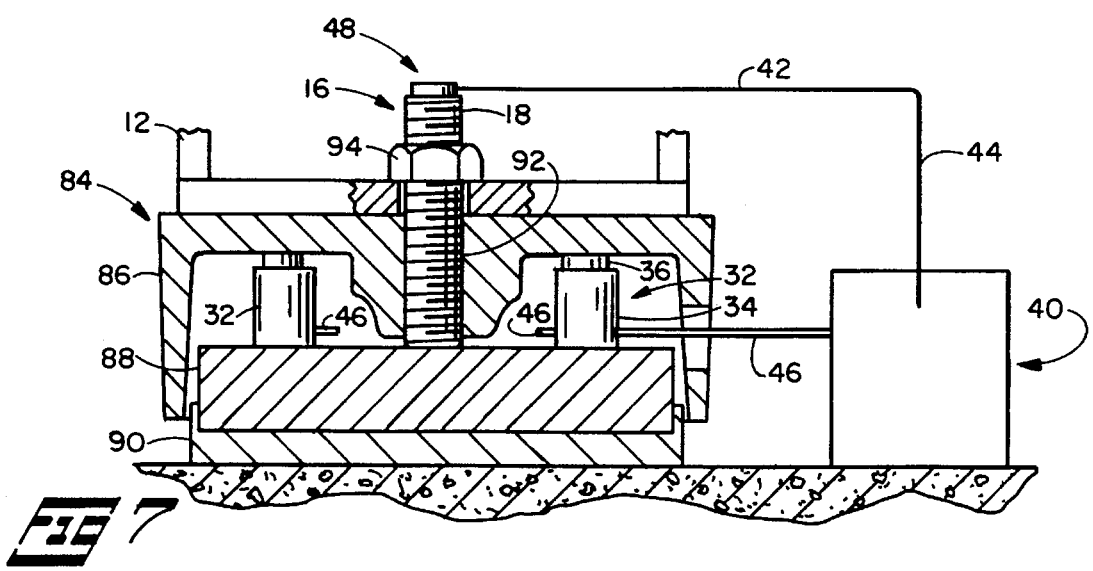

5,577,703

POWER ASSISTED ADJUSTMENT SYSTEM

FIELD OF THE INVENTION

This invention relates to a power assisted adjustment system used for adjusting a load. In its more specific aspect, this invention relates to a power assisted adjustment system for adjusting, assuming, positioning, leveling, or supporting a load member facilitated by the application of a relatively small force upon actuation of a load-relieving means to an activating position to allow for adjustment of the load position.

BACKGROUND AND PRIOR ART

Extremely heavy loads such a machinery, equipment, presses, buildings, bridges, etc., are subjected to shock and vibration and are susceptible to misalignment due to these forces and/or due to settling including settling of the foundation. Proper alignment, including leveling, flatness, and the like, is essential in order to operate efficiently, economically and safely.

The prior art discloses a number of adjustable mountings to correct for out-of-level or out-of-flatness conditions. This prior art includes U.S. Pat. Nos. 3,332,647 to Young; U.S. Pat. No. 4,047,427 to Young; and U.S. Pat. No. 4,846,436 to Young et al., which disclose an adjustment member engagable with a support member for the machine footing and maintained in spaced relationship from a bearing member. In U.S. Pat. No. 4,846,436, a hydraulic cylinder is disposed between the support member and bearing member, and when actuated relieves at least a portion of the load assumed by the adjustment member. The adjustment member can now be turned or rotated to adjust the out-of-level condition, and once corrected, the cylinder can be drained and the load returned to the adjustment member.

U.S. Pat. No. 4,489,991 to Delam discloses a support system for machines such as a turbogenerator connected by a common drive shaft and arranged on a base plate comprising a hydraulic cylinder and spring means for regulating or adjusting any spatial relationship between members, and then a blocking device or wedge is inserted to fill the space and decrease the load on the regulating members.

U.S. Pat. No. 3,807,034 relates to a screw mechanism that adjusts the elevation of two adjacent corners of a table simultaneously and equally by means of one control. The hydraulic cylinder relieves the load on the screw mechanism to make it easier to turn.

In accordance with the teachings of the aforesaid U.S. patents, the hydraulic cylinder is first actuated to lift a portion of the load; and then as a second, separate step the adjustment member or spacer is adjusted; and in a third step, the hydraulic cylinder is deactivated. In each situation, the lifting means (e.g. jack) is actuated separately from the adjustment means; that is, there is no teaching or suggestion that one function is actuated in direct response to another function—there is no force feedback actuation. When a mounting is to be adjusted, these three separate steps or functions frequently have to be repeated at each mounting point in order to achieve any change or adjustment in elevation. Although support systems or mountings of this type have been successful commercially, they are nevertheless time consuming, difficult to manipulate particularly in obtaining a very precise or accurate adjustment, and expensive.

SUMMARY OF THE INVENTION

In accordance with the present invention, there is provided a power assisted adjustment system for assuming or bearing a load member in a desired condition, which system operates with a minimum of effort and input, and hence is simple, fast, and inexpensive, thereby overcoming the disadvantages of prior art systems which are cumbersome, expensive, and slow. The adjustment system comprises a force-responsive means or actuator means in combination with an adjustment means, adaptable for assuming a load, and an actuable load-relieving means for temporarily reducing or relieving the load on the adjustment means, thereby permitting adjustment of extremely heavy loads with a nominal input force to the actuator means. Thus, actuator means or force-responsive means is operably engagable with the adjustment means and movable relative to the adjustment means. Activating means operably connected with the force-responsive means actuates the load-relieving means between an activating position and non-activating position, thereby permitting adjustment of the adjustment means in response to movement of the force-responsive means in the activating condition. Actuating the load-relieving means takes up an increasing portion of the load and thus increasingly relieves the load from the adjustment means. An input force or torque then can be applied to the force-responsive means to effect a desired adjustment of the adjustment means. When the input force is stopped or interrupted, the force-responsive means is biased to a non-activating position. The load-relieving means is deactivated and ceases to assume the portion of the load taken up, and that portion of the load is returned or transferred back to the adjustment means. The input force to the force-responsive means is nominal relative to the load, and thus it is possible, for example, to adjust by hand the positioning of extremely heavy machinery, equipment or structures weighing a hundred tons or more. For example, machines, buildings, bridges and the like weighing several millions of pounds can be raised, lowered or leveled simply by applying manually applied forces of a few pounds to the actuator means. Thus, it will be observed that the input force is nominal relative to the load, e.g. weight of the load. As used herein and in the appended claims, adjustment of a load is intended to include positioning, leveling, assuming, bearing, supporting, or the like, of a load.

The adjustment means includes any adjustment device used for bearing heavy loads, and may include, for example, a level-adjustment screw, wedging means, and the like useful for supporting machines, buildings, bridges, etc. The actuator means or force-responsive means is operably connected to the adjustment means, which connection may be temporary or permanent as explained below in greater detail, and force or torque applied to the actuator means is transferred to the adjustment means. However, force or torque transferred to the adjustment means is not sufficient to effect the desired adjustment without auxiliary means for relieving load assumed by the adjustment means. Thus, in accordance with my invention, actuating means operably connected with the force-responsive means actuates the load-relieving means which assumes an increasing amount of the load thereby relieving load on the adjustment means, and application of relatively small force or torque to the actuator means is transferred to the adjustment means to effect the desired adjustment. When the desired adjustment is achieved and the force or torque is terminated, suitable bias means deactivates the load-relieving means thereby transferring back fully the load to the adjustment means. Suitable load-relieving means includes a hydraulic cylinder, although it should be understood that the invention is not limited thereto.

In one embodiment of the invention, the force-responsive means comprises a rotatable member engagable with a substantially cylindrical adjustment member having an externally threaded portion threadedly engagable with the load. The rotatable member is rotatable relative to the adjustment member between an activating position and a non-activating position. A suitable actuating means is operably connected to the rotatable member for transmitting a signal for actuating the load relieving means, such as a hydraulic cylinder operated by a suitable control means upon an appropriate signal from the actuating means. For example, the actuating means may comprise an appropriate switch means electrically connected to a motor-operated pump for delivery of pressurized fluid to a cylinder, e.g. pressurized oil to a hydraulic cylinder, for relieving the load. Thus, activating the switch to close an electric circuit, activates the load-relieving means to relieve the load on the adjustment member, and a suitable coupling means or clutch engages or couples the rotatable member with the adjustment member to effect adjustable rotation of the adjustment member. In this manner, application of input force to the force-responsive means effects the desired rotational adjustment of the adjustment member in order to level the load or otherwise distribute the weight. When the input force is interrupted, suitable bias means operably connected with the rotatable member returns it to a non-activating position and the load is returned to the adjustment member.

BRIEF DESCRIPTION OF THE DRAWINGS

FIG. 1 is a diagrammatic, perspective view of a power assisted adjustment system used in conjunction with a machine footing and embodying the features of the present invention.

FIG. 2 is a fragmentary elevational view, partly in cross-section, showing the power assisted adjustment system of FIG. 1 in greater detail.

FIG. 3 is an elevational view of an adjustment member and actuator head utilized in a power assisted adjustment system of the type shown in FIG. 1.

FIG. 4 is a plan view of FIG. 3.

FIG. 5 an elevational sectional view taken on line 5—5 of FIG. 4.

FIG. 6 is a diagrammatic, perspective view of a power assisted adjustment system illustrating an alternative embodiment of the present invention.

FIG. 7 is a fragmentary elevational view, partly in cross-section, of a power assisted adjustment system illustrating in greater detail an alternative embodiment of the present invention.

FIG. 8 is a perspective view of an alternative embodiment of the power assisted adjustment system shown in use with the adjustment means.

FIG. 9 is a plan view of the embodiment of FIG. 8 illustrating in greater detail the features of this embodiment.

DETAILED DESCRIPTION OF THE INVENTION

FIGS. 1 and 2 diagrammatically illustrate a power assisted adjustment unit for load bearing members, which incorporates the features of the invention. In the drawings, wherein like reference numerals designate similar parts throughout, there is illustrated in FIGS. 1 and 2 a machine mounting unit such as to correct for out-of-level and/or out-of-flatness condition, and load member 12, shown in fragmentary view, may be a corner foot of a heavy machine to be adjustably spaced from a base member 14, such as the floor of a building. Although there is illustrated a single adjustment unit, it should be understood that the same unit can be used at each of the various mounting points of a machine, e.g. at each of the four corner feet of a machine, for leveling and fine-tuning the distribution of support for the entire machine. An adjustment member, indicated generally by the numeral 16, adaptable for bearing the load, and having its longitudinal axis substantially transverse to the load, comprises an externally threaded, cylindrical body portion or section 18 of a first diameter extending from a bearing portion 20 at the bottom end thereof and terminating at the top or upper portion with annular shoulder 22 (see FIGS. 3 and 5) and upwardly extending, cylindrical shank or torquing plate 24 of a reduced or second diameter having a transverse, planar surface 26 for peripheral alignment with the actuator head indicated generally at 48, as explained hereinbelow in detail. It will be observed that shank section 24 may be formed integrally with the adjustment member 16 such as by machining as a unitary body member 16 from a single piece, or by forming the shank separately and connecting it to the body of member 16 by welding or bolting, all of which is within the skill of the art. Where desired, shank section or torquing plate 24 may be formed as a separate unit and affixed with adjustment member 16 by means of a plurality of assembly pins 25 insertable into aligned apertures or holes 27 and 29 in plate 24 and adjustment member 16, respectively. This arrangement of the torquing plate 24 being a separate unit is advantageous in that the torquing plate and actuator head can be utilized on more than one adjustment member, as for example an adjustment member in each of four corners of a machine would require only one torquing plate and actuator head. The shank section 24 is provided with a plurality of internally threaded apertures or holes 28, preferably three such apertures, spaced inwardly from the periphery of the shank section, and for the reason explained below. Adjustment member 16 is seated at its lower end or bearing end 20 upon base member 14, e.g., building floor, and the threaded section 18 threadedly engages internally threaded aperture 30 of load member 12 for axial rotatable engagement. In this manner, adjustment member 16 is rotatable relative to the load and in fixed relation to the base member. It thus will be observed that because adjustment member 16 is seated on a stationary member, e.g., floor 14, and also threadedly engaged with the load, rotation of adjustment member 16 will raise or lower load member 12 and thereby correct for out-of-level or out-of-flatness condition.

Load-relieving means, indicated generally by the numeral 32, such as a hydraulic cylinder having a cylinder 34 and piston 36 of conventional design and operation, is seated on base member 14 adjacent the adjustment member 16 and positioned beneath load member 12 and oriented to engage a surface or side of the load, e.g. bottom. The load-relieving means 32 is actuated in response to a signal transmitted by suitable actuating means 38 (see FIG. 5) to an electrically connected control means 40, such as a motor-operated pump, having suitable connecting elements including electric cables or wires 42 and 44, and conduit 46, described below in greater detail. When piston 36 of the hydraulic cylinder 34 is actuated in response to a signal, as described below, a load-relieving force is exerted against the load member 12, e.g. against the bottom surface, thereby reducing or relieving the load on adjustment member 16. If desired, more than one load-relieving means may be utilized at each location, e.g. each corner foot of a machine, in which case all of the load-relieving means can be connected by suitable connecting elements with the control member, substantially as shown with the alternative embodiment in FIG. 7 and described below in more detail. A plurality of load-relieving means provides a more uniform distribution of the load-relieving force on both sides of the adjustment member.

Force-responsive means comprising an actuator head, indicated generally by the numeral 48, is co-axially mounted with respect to the longitudinal axis of adjustment member 16, and includes a rotatable member or annulus 50 operably engagable with the cylindrical shank 24 of the adjustment member. (See FIG. 5.)

The power assisted adjustment system as shown in FIGS. 3, 4 and 5 and in accordance with this embodiment of the invention, comprises an actuator head 48, formed as an annular cap, having annulus 50 operatively connected to shank or torquing plate 24, which is integral with adjustment member 16. Annulus 50 is disposed above plate 24 and spaced therefrom, as described below in more detail, and downwardly extending annular skirt 54 circumscribes at least a portion of plate 24. The rotatable annulus 50 is provided with a plurality of apertures or holes 58, preferably three, which, upon assembly concentrically align along the longitudinal axis with internally threaded apertures 28 of torquing plate 24. Further, each aperture 58 has a reduced section 62 thereby forming opposed, annular shoulders 64 and 66. Assembly pins 68, each having an elongated shank 70 terminating with annular shoulder 72 and externally threaded section 74, are inserted through the apertures 58 in annulus 50 so that threaded ends 74 threadedly engage internally threaded apertures 28 until shoulder 72 abuts the top surface 26 of the torquing plate 24. It will be observed that shoulder 72 on each of the pins 68 forms a stop means so that a predetermined portion of each pin 68 extends above the plate 24. Coiled spring 76 surrounds the shank or spindle section of each pin 68 and is seated at one end on the top surface of torquing plate 24 and at the upper end on shoulder 64. The head 69 of each pin 68 seats on shoulder 66. Cavity or chamber 78 is thus formed between the underside of the rotatable member 50 and the top surface 26 of torquing plate 24 for accommodating switch means 38. Each of the pins 68 has a large enough head 69 to engage the rotatable member 50 from the top and hold it down against the pressure exerted by spring 76. When a sufficient number of spring biased mountings like those just described, preferably three such mountings, are arranged in spaced relationship adjacent the periphery of the torquing plate 24 and rotatable member 50, and preferably have their center longitudinal axes substantially parallel with the longitudinal axis of the rotatable member, it will be observed that the rotatable member 50 will be spring-biased away from the torquing plate 24 to form chamber 78.

Contact switch 38 is mounted on the underside of rotatable member 50 and within chamber 78 so that the switch will be activated when the rotatable member 50 is pushed downward and into contact with the torquing plate 24. Normally, due to the bias of springs 76, switch 38 is held away from plate 24 so that the switch will remain in an electrically open position, but by pushing the rotatable member downwardly against the bias of springs 76 to bring the switch in contact with the torquing plate 24, the switch is closed. The switch 38 is connected by an electric cables 82 to a suitable electrical receptacle 84 located in the skirt 54 of the rotatable member 50. Cable 42 joined to the receptacle 84 leads to the load-relieving means 32 via cable 44 and control means 40, which is actuated by closing the switch 38 to initiate the actuation of a pump sending fluid under pressure to the load-relieving member 32, such as a hydraulic cylinder. Thus, when pressure is applied to annulus 50 and is pushed downwardly to close switch 38, the load-relieving means 32 is actuated thereby relieving an increased portion of the load on the adjustment member 16, and hence the pressure on the external threads of the adjustment member 16 is alleviated. The application of only a relatively small or nominal torque or force on the annulus 50 is then required in order to turn the adjustment member 16.

It may be that the cable leading from the receptacle 84 to the pump might tend to become twisted as the adjustment 16 is turned, but attaching a ratchet to the adjustment member to permit it turning in small increments only will avoid placing too great a strain on the cable.

With the actuator head 48 assembled and rigidly mounted to the adjustment member 16, as described above, downward pressure such as hand pressure by the operator on rotatable member 50 actuates the switch 38 which closes the circuit thereby actuating load-relieving means 32 and relieving the load. Input force or torque applied to the actuator head 48 ash by turning rotatable member 50, clockwise or counterclockwise, is transmitted to the adjustment member 16 to effect adjustment thereof. Suitable means for biasing the actuator head to a non-activating position comprises coil spring 76 mounted on the shank 70 of pin member 68. The spring is of a predetermined stiffness such that it can be compressed by the appropriate downward hand pressure applied to rotatable member 50, but has sufficient resilience so as to break contact with the switch 38 when application of torque is interrupted. Thus, by reason of the actuating means 38 to close the switch and send a signal by electrical conductor 82 to receptacle 84 and then via electric cables or conductors 42 and 44 to control member 40 to actuate a pump member for supplying pressurized, hydraulic fluid, e.g. oil, via conduit 46 to the load-relieving means 32, e.g. hydraulic cylinder, torque can be applied to the force-responsive means 48 by turning the rotatable member 50 in a clockwise or counterclockwise direction.

In the power assisted adjustment unit as shown in FIGS. 15, a suitable pump unit or control means 40 is in fluid communication with load-relieving means 32, e.g., a hydraulic cylinder, via conduit or line 46 for delivering pressurized hydraulic fluid such as oil to load-relieving means 32. Force-responsive means or actuator head 48 is operatively connected to control member 40 via the switch means or actuating means 38 and electrical connections including electric cables 42 and 44. An electric signal from the switch means incorporated or associated with the force-responsive means actuates the pump for delivering pressurized hydraulic fluid to the load-relieving means. This command or signal from the actuating means or switch means 38 is issued when pressure is applied to rotatable member 50 as by hand, and then force or torque can be applied to the adjustment member 16 to effect adjustment thereof, and this signal is uninterrupted as long as torque is continued to be applied to effect adjustment of the adjustment member.

When the load relieving means 32 is actuated, and the piston head 36 is forced against the bottom of the load member 12, the weight or load on the adjustment member 16 is substantially reduced or relieved. The continual application of torque or force to the actuator head 48 is sufficient to effect rotation or turning of adjustment member 16 as long as the load on adjustment member 16 is reduced sufficiently. It will be observed that by reason of this force feed-back of the load-relieving means 32, it is possible to adjust the adjustment member 16 with an input force that is nominal only, e.g. by hand or a hand wrench, relative to the load, notwithstanding that the machine supported by the adjustment unit of the invention may weigh hundred's of tons, e.g., 1,000,000 pounds in this manner, the load may be easily corrected for out-of-level or out-of-flatness condition, without distorting the weight distribution and without the need for extra ordinary lifting and leveling equipment. When the torque applied to the rotatable member is interrupted or stopped, the coiled spring 76 returns the rotatable member 50 back to its non-activating position relative to the torquing plate 24, and the signal along electrical conductors 42 and 44 is automatically terminated, thereby shutting off the pump and stopping delivery of hydraulic fluid to load-relieving member 32. The fluid exits from the hydraulic cylinder, and the piston retracts thereby returning all the load to adjustment member 16.

In an alternative adjustment system such as shown in FIGS. 6 and 7, the load member, e.g. machine footing 12, is supported by a mount, indicated generally by the numeral 84, and therefore is spaced from the base member 14, substantially as shown in U.S. Pat. Nos. 3,332,647 and 4,846,436 cited above. Broadly, in such systems, the adjustment member 16 threadedly engages a supporting member 86 of sufficient size for supporting the load, e.g. machine footing 12. The bottom end of the adjustment member 16 seats on a bearing member 88 spaced from the base 14 (e.g. floor) by a resilient member 90 disposed on the base member 14. For such an alternative embodiment utilizing a mount 84, the load-relieving means may be arranged in parallel with the elements of the mount (i.e., resilient member 90 and bearing member 88) as shown in FIG. 6. Where desired, the load-relieving means 32 are arranged in series as shown in FIG. 7, in that the load-relieving means is disposed intermediate the bearing member 88 (which is seated on resilient member 90) and the supporting member 86, and explained in more detail below. An arrangement in series is sometimes found to be advantageous in that the machine foot 12 is not raised because there is no change of load on the resilient member 90, and therefore no change of deflection (i.e., compression) of that member when the load-relieving means is actuated, and the adjustment member 16 remains in contact with the bearing member 88.

As shown in FIGS. 6 and 7, an isolating machinery mount, indicated generally by the numeral 84, incorporates an elastomeric cushion member 90 which is ordinarily compressible and resilient. The cushion member 90 rests on the floor 14 of a building in which a piece of machinery is located (not shown) so that one foot 12 of the machine may be positioned on the mount 84. The cushion member 90 is disposed in immediate supporting relationship below a bearing member or plate 88. A machinery supporting member or housing 86 is arranged or disposed above the bearing member 88, and normally is of such a size that a foot 12 of a machine to be supported thereon will seat or engage the uppermost planar surface thereof. Supporting member 86 is provided with a centrally disposed threaded aperture 92 for threaded engagement with the externally threaded portion 18 of adjustment member 16. In this manner, adjustment member 16 is rotatably engagable with the supporting member 86. The bottom of adjustment member 16 abuts the top surface of the bearing member 88. It will be observed that upon rotation of the adjustment member 16, one can vary the distance between machinery supporting member 86 and the bearing member 88. A locking nut 94 is also provided to fix the adjustment member 16 in place relative to the machinery supporting member 86 upon adjustment of the adjustment member 16.

It will be observed from an examination of FIGS. 6 and 7 that the machinery supporting member 86 is spaced from the building floor 14 which supports the elastomeric cushion 90. Thus, any vibrations transmitted through the floor 14 (or foundation) below the cushion member 90 will be dampened and not fully transmitted to any equipment resting on the machinery supporting member 86. Similarly any vibration or impact forces generated by the operation of a machine resting on member 86 will be only partially transmitted to the floor through mount 84 and adjustment member 16.

As shown in FIG. 7, located adjacent the adjustment member 16 is a load-relieving means 32, which may be a hydraulic cylinder, oriented to engage the bottom side of the machinery supporting member or housing 86 when the piston is activated. It may be desirable to have a plurality of load-relieving members 32 interposed between the bearing member 88 and the machinery supporting member 86, arranged as shown in FIG. 7, so that the downward forces applied by the plurality of load-relieving members 32 to the bearing plate 88 are symmetrical about the center of the resilient member 90 to prevent uneven loading on resilient member 90 and tilting of the bearing member 88. When there is a plurality of load-relieving members 32 within a single machinery mount unit 84, arranged as shown in FIG. 7, each of the load-relieving members 32 is connected through a high pressure line or conduit 46 having suitable connecting means and thence to a source of hydraulic fluid such as shown in U.S. Pat. No. 4,846,436. Thus, all of the load-relieving members may be operated simultaneously from the pressure fluid source.

Actuator head or force-responsive means 48 is co-axially mounted with adjustment member 16, as described above. Upon application of pressure to actuator head 48, load-relieving means 32 is actuated, and a torque or force applied to rotatable member 50 effects a desired adjustment of adjustment member 16, substantially as described above. When the load-relieving means 32 is activated, an increasing upward force is brought to bear on the supporting member 86 and an equal downward force on the bearing member 88 which releases a substantial amount or all of the normal force between the sets of threads engaged between the adjustment member 16 and the support member 86 without reducing the load on or deflection (compression) of the resilient member 90. There is no reduction in deflection of the resilient member because the reduction in load on the adjustment member is achieved by transferring the load to the load-relieving member 32, both of which are supported on the same bearing member which in turn is supported on the resilient member. Thus, a corner of the machine needs to be raised by only the infinitesimal amount corresponding to the reduction of the shear strain distortion in the mating threads of the adjustment member and support member required to permit adjustment of the adjustment member.

The power assisted adjustment system embodying the invention is not limited to a force-responsive means comprising a substantially annular member, e.g. cylindrical cap, wheel, or the like such as of the type described above and co-axially mounted with the adjustment means, but it should be understood that such means may comprise a more conventional form of tool for use in the adjustment system of the invention. Thus, the force-responsive means may be a wrench of a generally conventional structure having a jaw for engaging the adjustment means and a longitudinally extending handle for turning or rotating the wrench as by hand, but modified to be utilized in the system of the invention. One such alternative embodiment utilizing a wrench having a switch means to actuate a load-relieving means, and by applying torque to the wrench, adjust the adjustment member is shown in FIGS. 8 and 9. In this embodiment, wrench 110, typically disposed radially with respect to the longitudinal axis of the adjustment means 16, is provided at one end of the body section 112 with a jaw opening 114 for engaging an hexagonal head 116 formed integrally with the adjustment member 16. Although a jaw of fixed size is shown, it should be understood that the jaw may have an adjustable opening by providing a fixed portion and a movable (adjustable) portion, of the type well known in the art. Adjustment member 16 can be provided with a longitudinally extending engagement post (not shown) and desirably having an integrally formed hexagonal head 116 or other suitable configuration so as to be a complementary fit to jaw 114.

In more detail, wrench 110 comprises an elongated body 112 having a jaw 114 at one end thereof and a handle portion 118 at the other end, and although a jaw of fixed size is shown, it should be understood that the jaw may have an adjustable opening. It will be observed that the wrench 110 is readily removable from the hexagonal head 116 of the engagement post. The handle 118 extending from the opposed end of the body portion 112 of the wrench is recessed at 120 to accommodate reciprocable button or plunger 124 biased by flat spring 126 so that end 128 of the button protrudes from the marginal surface of the handle 118. The opposite end 130 of the button 124 engages one side of a contact switch 132, encased or protected by bracket 134, so that when pressure is applied to exposed end 128 as by an operator's hand, opposed end 130 is pressed down to close switch 132. Electric wires 136, which are connected to the switch, carry a signal to a suitable control means, such as control means 40 shown in FIG. 1, for directing fluid under pressure to a load relieving means 32. Thus, by depressing button 124 to close switch 132, the load-relieving means 32 is activated to alleviate the load on the adjustment member 16, and applying a rotatable force or torque to the wrench 110 operably effects an adjustment of the adjustment member 16. Removal of the force to the wrench 110 and release of the button 124 returns the load to the adjustment member.

It will be observed that by reason of my invention numerous advantages are achieved in adjusting the position or level of a load. Further, it should be understood that the foregoing detailed description has been given for clearness of understanding only, and no unnecessary limitations should be understood therefrom, as modifications will be obvious to those skilled in the art.

What is claimed is:

1. A power assisted adjustment system, comprising: (a) adjustment means adaptable for assuming a load; (b) actuable load-relieving means for temporarily reducing the load on said adjustment means; (c) force-responsive means operably engagable with said adjustment means and movable relative to said adjustment means; (d) actuating means operably connected with said force-responsive means for actuating said load-relieving means between an activating position and a non-activating position to effect adjustment of said adjustment means in response to input force to said force-responsive means in said activating position, and (e) means to bias said actuating means to said non-activating position.

2. A power assisted adjustment system according to claim 1 wherein said actuating means comprises an electrical means activated by application of pressure against said bias means.

3. A power assisted adjustment system according to claim 1 wherein said force-responsive means is biased to maintain said actuating means in said non-activating position.

4. A power assisted adjustment system according to claim 1 wherein said adjustment means is threadedly engagable with said load and rotatable relative thereto, said adjustment means having a longitudinal axis substantially transverse to said load, said force-responsive means comprises a rotatable annulus having a longitudinal axis substantially aligned with the longitudinal axis of said adjustment axis, means to bias said annulus to maintain said actuating means in said non-activating position, whereby pressure against said bias means actuates said actuating means and rotation of said annulus effects adjustment of said adjustment means.

5. A power assisted adjustment system according to claim 4 wherein said actuating means comprises electrical means disposed on said annulus and arranged for actuation upon contact with said adjustment means, and means to bias said annulus in spaced relationship with said adjustment means.

6. A power assisted adjustment system according to claim 1 wherein said force-responsive means comprises a wrench having a jaw means and a handle extending longitudinally from said jaw means, and means integral with said adjustment means and adaptable for engagement by said jaw means.

7. A power assisted adjustment system according to claim 6 wherein said actuating means comprises an electrical means activated by application of pressure against said bias means.

* * * * *